(12) United States Patent
Border (10) Patent No.: US 12,021,604 B2
(45) Date of Patent: Jun. 25, 2024

(54) TIMING ALIGNMENT FOR INROUTE TRANSMISSION IN A SATELLITE COMMUNICATION SYSTEM

(71) Applicant: Hughes Network Systems, LLC, Germantown, MD (US)

(72) Inventor: John Leonard Border, Middletown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 217 days.

(21) Appl. No.: 17/827,455

(22) Filed: May 27, 2022

(65) Prior Publication Data

US 2023/0412262 A1    Dec. 21, 2023

(51) Int. Cl.
*H04J 3/06* (2006.01)
*H04B 7/185* (2006.01)
*H04W 56/00* (2009.01)
*H04W 84/06* (2009.01)

(52) U.S. Cl.
CPC ........ *H04B 7/18589* (2013.01); *H04J 3/0652* (2013.01); *H04W 56/001* (2013.01); *H04W 84/06* (2013.01)

(58) Field of Classification Search
None
See application file for complete search history.

(56) References Cited

U.S. PATENT DOCUMENTS

| | | | |
|---|---|---|---|
| 9,026,042 B1 * | 5/2015 | Nemeth | H04B 7/18582 455/12.1 |
| 10,194,408 B2 * | 1/2019 | Regunathan | H04B 7/18513 |
| 2021/0044371 A1 * | 2/2021 | Chen | H04J 13/0003 |
| 2021/0058293 A1 | 2/2021 | Whitefield et al. | |
| 2021/0168033 A1 * | 6/2021 | Whitefield | H04L 41/0896 |
| 2022/0132447 A1 * | 4/2022 | Masal | G01S 19/46 |
| 2022/0191767 A1 * | 6/2022 | Ravichandran | H04W 64/003 |
| 2022/0209850 A1 * | 6/2022 | Lee | H04B 7/18515 |
| 2022/0209860 A1 * | 6/2022 | Oza | H04B 7/18584 |

OTHER PUBLICATIONS

Lin-Nan LEE et al., "Scrambled Coded Multiple Access, Variations and Improvements", 2018 IEEE Glovecom, IEEE Dec. 9, 2018, pp. 1-7.
International Search Report and Written Opinion for Application No. PCT/US2023/021914, dated Sep. 13, 2023, 11 pages.

* cited by examiner

Primary Examiner — Alpus Hsu
(74) Attorney, Agent, or Firm — MANNAVA & KANG, PC; George Y. Wang (57) ABSTRACT

Systems and methods for aligning timing of an inroute transmission of a terminal with a gateway are disclosed. A system may include a processor and a memory storing instructions, which when executed by the processor, may cause the processor to perform a random estimation of location pertaining to a time-division multiple access (TDMA) frame boundary of a gateway. Based on an asynchronous scrambled coded multiple access (ASCMA) technique, the system may transmit ASCMA group burst packets including precise timing feedback request for the gateway. The system may receive a feedback from the gateway, in response to the precise timing feedback request. The processor may determine an adjustment for aligning timing of an inroute transmission of the terminal with respect to the TDMA frame boundary of the gateway. The system may apply the adjustment to synchronize the timing of the inroute transmission of the terminal with the gateway.

20 Claims, 8 Drawing Sheets

| Inroute Symbol Rate (kSPS): | 2048 | | | Symbols per Frame: | 92160 | | | Symbols per Zone: | 1440 | | |
|---|---|---|---|---|---|---|---|---|---|---|---|
| Zone Number | Symbol Start | Symbol End | Zone Number | Symbol Start | Symbol End | Zone Number | Symbol Start | Symbol End | Zone Number | Symbol Start | Symbol End |
| 0 | 0 | 1439 | 16 | 23040 | 24479 | 32 | 46080 | 47519 | 48 | 69120 | 70559 |
| 1 | 1440 | 2879 | 17 | 24480 | 25919 | 33 | 47520 | 48959 | 49 | 70560 | 71999 |
| 2 | 2880 | 4319 | 18 | 25920 | 27359 | 34 | 48960 | 50399 | 50 | 72000 | 73439 |
| 3 | 4320 | 5759 | 19 | 27360 | 28799 | 35 | 50400 | 51839 | 51 | 73440 | 74879 |
| 4 | 5760 | 7199 | 20 | 28800 | 30239 | 36 | 51840 | 53279 | 52 | 74880 | 76319 |
| 5 | 7200 | 8639 | 21 | 30240 | 31679 | 37 | 53280 | 54719 | 53 | 76320 | 77759 |
| 6 | 8640 | 10079 | 22 | 31680 | 33119 | 38 | 54720 | 56159 | 54 | 77760 | 79199 |
| 7 | 10080 | 11519 | 23 | 33120 | 34559 | 39 | 56160 | 57599 | 55 | 79200 | 80639 |
| 8 | 11520 | 12959 | 24 | 34560 | 35999 | 40 | 57600 | 59039 | 56 | 80640 | 82079 |
| 9 | 12960 | 14399 | 25 | 36000 | 37439 | 41 | 59040 | 60479 | 57 | 82080 | 83519 |
| 10 | 14400 | 15839 | 26 | 37440 | 38879 | 42 | 60480 | 61919 | 58 | 83520 | 84959 |
| 11 | 15840 | 17279 | 27 | 38880 | 40319 | 43 | 61920 | 63359 | 59 | 84960 | 86399 |
| 12 | 17280 | 18719 | 28 | 40320 | 41759 | 44 | 63360 | 64799 | 60 | 86400 | 87839 |
| 13 | 18720 | 20159 | 29 | 41760 | 43199 | 45 | 64800 | 66239 | 61 | 87840 | 89279 |
| 14 | 20160 | 21599 | 30 | 43200 | 44639 | 46 | 66240 | 67679 | 62 | 89280 | 90719 |
| 15 | 21600 | 23039 | 31 | 44640 | 46079 | 47 | 67680 | 69119 | 63 | 90720 | 92159 |

FIG. 5A

| INROUTE SYMBOL RATE (KSPS): | | 4096 | SYMBOLS PER FRAME: | | 184320 | SYMBOLS PER ZONE: | | 2880 | |
|---|---|---|---|---|---|---|---|---|---|
| ZONE NUMBER | SYMBOL | | ZONE NUMBER | SYMBOL | | ZONE NUMBER | SYMBOL | | |
| | START | END | | START | END | | START | END | |
| 0 | 0 | 2879 | 16 | 46080 | 48959 | 32 | 92160 | 95039 | 48 | 138240 | 141119 |
| 1 | 2880 | 5759 | 17 | 48960 | 51839 | 33 | 95040 | 97919 | 49 | 141120 | 143999 |
| 2 | 5760 | 8639 | 18 | 51840 | 54719 | 34 | 97920 | 100799 | 50 | 144000 | 146879 |
| 3 | 8640 | 11519 | 19 | 54720 | 57599 | 35 | 100800 | 103679 | 51 | 146880 | 149759 |
| 4 | 11520 | 14399 | 20 | 57600 | 60479 | 36 | 103680 | 106559 | 52 | 149760 | 152639 |
| 5 | 14400 | 17279 | 21 | 60480 | 63359 | 37 | 106560 | 109439 | 53 | 152640 | 155519 |
| 6 | 17280 | 20159 | 22 | 63360 | 66239 | 38 | 109440 | 112319 | 54 | 155520 | 158399 |
| 7 | 20160 | 23039 | 23 | 66240 | 69119 | 39 | 112320 | 115199 | 55 | 158400 | 161279 |
| 8 | 23040 | 25919 | 24 | 69120 | 71999 | 40 | 115200 | 118079 | 56 | 161280 | 164159 |
| 9 | 25920 | 28799 | 25 | 72000 | 74879 | 41 | 118080 | 120959 | 57 | 164160 | 167039 |
| 10 | 28800 | 31679 | 26 | 74880 | 77759 | 42 | 120960 | 123839 | 58 | 167040 | 169919 |
| 11 | 31680 | 34559 | 27 | 77760 | 80639 | 43 | 123840 | 126719 | 59 | 169920 | 172799 |
| 12 | 34560 | 37439 | 28 | 80640 | 83519 | 44 | 126720 | 129599 | 60 | 172800 | 175679 |
| 13 | 37440 | 40319 | 29 | 83520 | 86399 | 45 | 129600 | 132479 | 61 | 175680 | 178559 |
| 14 | 40320 | 43199 | 30 | 86400 | 89279 | 46 | 132480 | 135359 | 62 | 178560 | 181439 |
| 15 | 43200 | 46079 | 31 | 89280 | 92159 | 47 | 135360 | 138239 | 63 | 181440 | 184319 |

TIMING ALIGNMENT FOR INROUTE TRANSMISSION IN A SATELLITE COMMUNICATION SYSTEM

TECHNICAL FIELD

This patent application is directed to satellite communication systems and, more specifically, to systems and methods for facilitating alignment in timing of an inroute transmission of a terminal with a gateway.

BACKGROUND

In satellite communication systems, multiple terminals (user terminal) located in a service area may transmit data to the satellite or corresponding gateway, where the transmission of the data by the terminals may be termed as inroute transmission. The terminal may need to synchronize the timing of the inroute transmission in accordance with the timing at the gateway. For example, the time synchronization may be based on a time-division multiple access (TDMA) frame boundary of a gateway.

Known techniques for synchronizing network timing may require a terminal to be provided with its approximate location or distance from a satellite to transmit into a special window known as a Bootstrap Aloha (BA) aperture to get timing feedback. However, such techniques may include the disadvantage of lack of precision. For example, if the location information of the terminal is less precise then this may lead to increase in the desired BA aperture size. In this case, if the BA aperture may be significantly large enough (greater than a certain limit), then it may represent a non-trivial overhead. Further, the implementation involving such apertures may be subject to usual possibility of collision, thus leading to an ineffective alignment of timing.

SUMMARY

The present disclosure relates to a system including a processor; and a memory storing instructions, which when executed by the processor, cause the processor to perform a random estimation of location pertaining to a time-division multiple access (TDMA) frame boundary of a gateway, wherein the random estimation considers an estimated frame number in the TDMA frame boundary such that the estimated frame number corresponds to a first time instance at which group burst packets from a terminal of a plurality of terminals are expected to arrive at the gateway. The system is, through the processor, further caused to transmit, using an asynchronous scrambled coded multiple access (ASCMA) technique, the group burst packets to the gateway, wherein the group burst packets comprise a precise timing feedback request for the gateway. In an aspect, the system, through the processor, is further caused to receive, from the gateway, a feedback in response to the precise timing feedback request, wherein the feedback corresponds to an actual frame number and symbol number corresponding to a second time instance at which the group burst packets were received by the gateway. Based on a comparison of the first time instance corresponding to the estimated frame and the second time instance corresponding to the actual frame number and symbol number, an adjustment for aligning timing of an inroute transmission of the terminal with respect to the TDMA frame boundary of the gateway is determined. The determined adjustment is then applied to synchronize the timing of the inroute transmission of the terminal with respect to the TDMA frame boundary of the gateway.

The present disclosure also relates to a method comprising performing, by a processor, a random estimation of location pertaining to a time-division multiple access (TDMA) frame boundary of a gateway, wherein the random estimation considers an estimated frame number in the TDMA frame boundary such that the estimated frame number corresponds to a first time instance at which group burst packets from the terminal of the plurality of terminals are expected to arrive at the gateway. The method also includes transmitting, by the processor, using an asynchronous scrambled coded multiple access (ASCMA) technique, the group burst packets to the gateway, wherein the group burst packets comprise a precise timing feedback request for the gateway. The method also includes receiving, by the processor, from the gateway, a feedback in response to the precise timing feedback request, wherein the feedback corresponds to an actual frame number and symbol number corresponding to a second time instance at which the group burst packets are received by the gateway. The method also includes determining, by the processor, based on the comparison of the first time instance corresponding to the estimated frame and the second time instance corresponding to the actual frame number and symbol number, an adjustment for aligning timing of the inroute transmission of the terminal with respect to the TDMA frame boundary of the gateway.

The present disclosure also relates to non-transitory computer-readable storage medium having an executable stored thereon, which, when executed, instructs a processor to perform a random estimation of location pertaining to a time-division multiple access (TDMA) frame boundary of a gateway, wherein the random estimation considers an estimated frame number in the TDMA frame boundary such that the estimated frame number corresponds to a first time instance at which group burst packets from a terminal of a plurality of terminals is expected to arrive at the gateway. The processor is also instructed to transmit, using an asynchronous scrambled coded multiple access (ASCMA) technique, the group burst packets to the gateway, wherein the group burst packet comprises a precise timing feedback request for the gateway. The processor is also instructed to transmit, using an asynchronous scrambled coded multiple access (ASCMA) technique, the group burst packets to the gateway, wherein the group burst packet comprises a precise timing feedback request for the gateway. The processor is also instructed to receive, from the gateway, a feedback in response to the precise timing feedback request, wherein the feedback corresponds to an actual frame number and symbol number corresponding to a second time instance at which the group burst packets are received by the gateway. The processor is also instructed to determine, based on the comparison of the first time instance corresponding to the estimated frame and the second time instance corresponding to the actual frame number and symbol number, an adjustment for aligning timing of the inroute transmission of the terminal with respect to the TDMA frame boundary of the gateway. The processor is also instructed to apply the determined adjustment to synchronize the timing of the inroute transmission of the terminal with respect to the TDMA frame boundary of the gateway.

BRIEF DESCRIPTION OF DRAWINGS

Features of the systems and methods are illustrated by way of example and not limited in the following Figure(s), in which like numerals indicate like elements, in which.

DETAILED DESCRIPTION

For simplicity and illustrative purposes, the present systems and methods are described by referring mainly to examples and embodiments thereof. In the following description, numerous specific details are set forth to provide a thorough understanding of the systems and methods described herein. It will be readily apparent, however, that the systems and methods may be practiced without limitation to these specific details. In other instances, some methods and structures readily understood by one of ordinary skill in the art have not been described in detail so as not to unnecessarily obscure the systems and methods described herein. As used herein, the terms "a" and "an" are intended to denote at least one of a particular element, the term "includes" means includes but not limited to, the term "including" means including but not limited to, and the term "based on" means based at least in part on.

As described above, known techniques for synchronizing network timing of a terminal with a gateway may involve precise information regarding location of the satellite to avoid a larger Bootstrap Aloha (BA) aperture and the associated overhead. However, using the system and method described herein for satellite communication, the implementation may require no apertures and it may be possible for a terminal to transmit a request at any random timing and get a precise timing feedback response from the gateway. In some examples, the systems and method described herein may utilize an asynchronous scrambled coded multiple access (ASCMA) technique for transmitting the request. In case of ASCMA transmission, the collision may be handled as the technique may be a shared access medium that may support canceling out overlapping transmissions. Various other advantages may be possible.

The systems and methods described herein, thus provide an effective approach to overcome the mentioned limitations. In an example, the system may include a processor including a memory storing instructions to be executed by the processor. The processor may perform a random estimation of location pertaining to a time-division multiple access (TDMA) frame boundary of a gateway. In an example, the random estimation may consider an estimated frame number in the TDMA frame boundary such that the estimated frame number corresponds to a first time instance at which group burst packets from a terminal of a plurality of terminals may be expected to arrive at the gateway. In some examples, the random estimation of the estimated frame number may be performed based on an approximate value of an inroute frame number corresponding to a superframe numbering packet (SFNP) received at the terminal from the gateway.

The system may transmit the group burst packets to the gateway using the ASCMA technique. The group burst packets may include a precise timing feedback request for the gateway. The system may receive a feedback from the gateway, in response to the precise timing feedback request. In an example, the feedback may correspond to an actual frame number and symbol number corresponding to a second time instance at which the group burst packets may be received by the gateway. For example, the feedback may be in a form of an ASCMA Bootstrap Aloha Feedback (ABAF) including information related to the actual frame number and the symbol number pertaining to the TDMA boundary at which the group burst packets may be actually received.

The system may determine an adjustment for alignment timing of an inroute transmission of the terminal with respect to the TDMA frame boundary of the gateway. The adjustment may be determined based on the comparison of the first time instance corresponding to the estimated frame and the second time instance corresponding to the actual frame number and symbol number. The system may further apply the determined adjustment to synchronize the timing of the inroute transmission of the terminal with respect to the TDMA frame boundary of the gateway. In some examples, the adjustment may be positive or negative depending on a position of the estimated frame number in the TDMA frame boundary with respect to the actual frame number and the symbol number.

In some examples, the group burst packets may pertain to a series of bursts including encoded ASCMA transmission. The ASCMA transmission may be transmitted in an asynchronous manner and independent of pre-defined time slots. In some examples, the required adjustment may pertain to a shift in timing corresponding to a shift from the estimated frame number to the actual frame number and the symbol number. In some examples, the precise timing feedback request may be added in a form of a precise feedback requested (PFR) flag. For example, the precise feedback requested (PFR) flag may be added to a Group Burst Encapsulation (GBE) header of a first burst of the group burst packets. In some examples the precise feedback requested (PFR) flag may include a note pertaining to the random estimation of the estimated frame number.

In some examples, the feedback may be provided in response to the feedback request upon assessment of the PFR flag in the GBE header of the first burst by an inroute demodulator controller (IDC) of the gateway. The IDC may notify an inroute group manager (IGM) of the gateway to provide the feedback. In some example, the system may monitor a corresponding acknowledgement received for the inroute transmission within the TDMA frame boundary of the gateway. For example, when the acknowledgment may not be received for a group burst pertaining to the TDMA, the applied adjustment may be considered as out of sync and a re-adjustment may be applied. Several other features or advantages may be realized.

Figure 1:
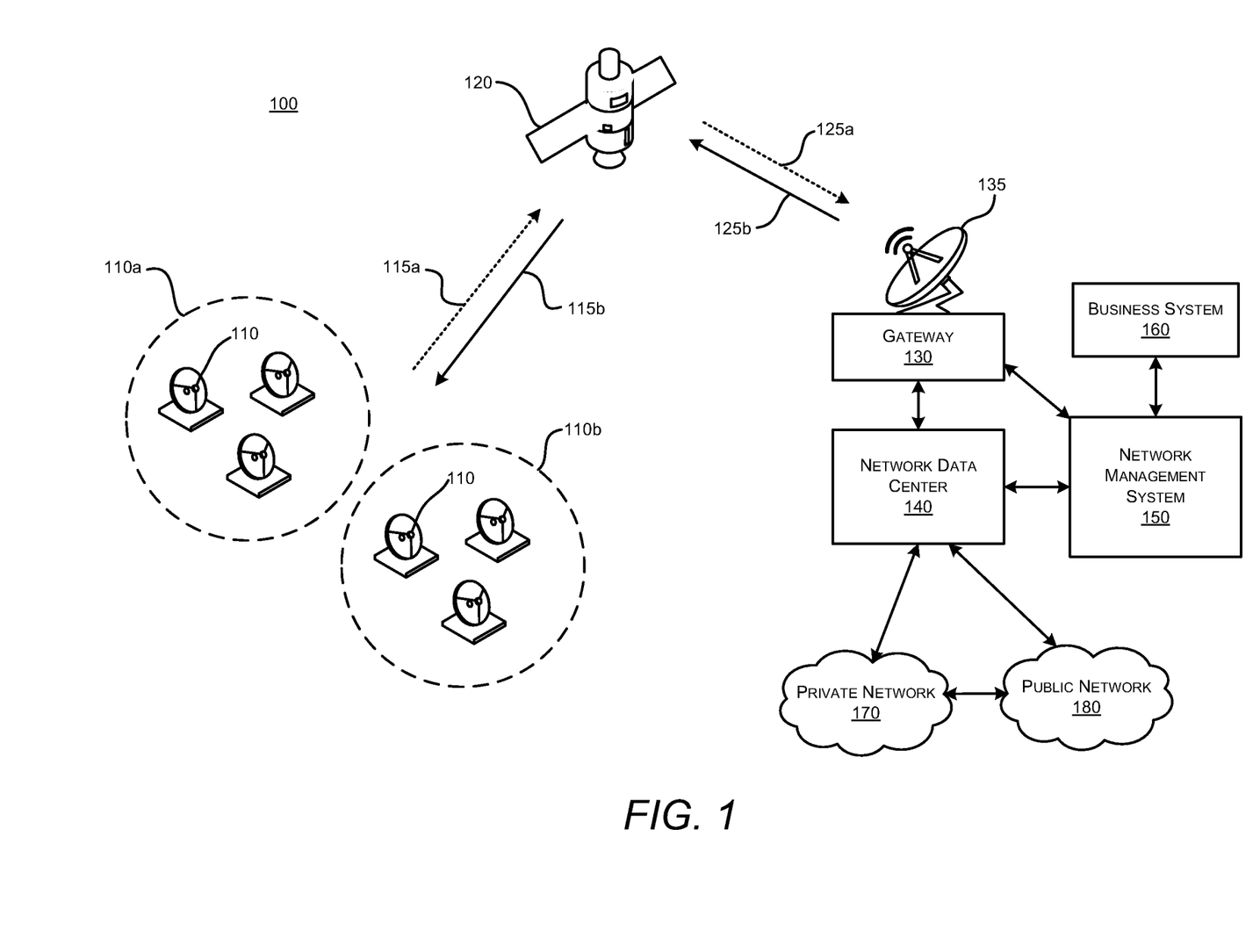
FIG. 1 illustrates a system for facilitating inroute transmission of data, according to an example.

FIG. 1 illustrates a system for facilitating inroute transmission of data, according to an example. In some examples, the system 100 may pertain to a satellite communication system including a satellite 120 that may use one or more beams to provide service over an extended geographic area to at least one terminal 110 of a plurality of terminals (hereinafter also interchangeably referred to as terminals 110 or user terminal 110 or UT 110). The satellite communication system may be capable of providing at least voice and/or data services. In some examples, the terminals 110 may transmit data 115*a* to the satellite 120 and to the gateway 130 respectively as inroute transmission 115*a* and 125*a*. The satellite 120 may relay signal to the at least one terminal 110 from a gateway 130 via channels 125*b* and 115*b* respectively. In some examples, the system 100 may include any number of terminals 110, satellite 120, gateway 130, a network data center 140, a network management system (NMS) 150, a business system 160, or other various system elements or components. The system 100 may also include a private network 170 and/or public network 180. It should be appreciated that the system 100 depicted in FIG. 1 may be an example. Thus, the system 100 may or may not include additional features and some of the features described herein may be removed and/or modified without departing from the scopes of the system 100 outlined herein.

The terminals 110 may be any variety of terminals. For example, the terminals 110 may be customer terminals, such as very small aperture terminals (VSATs). It should be appreciated that VSATs may be terminals that may be mounted on a structure, habitat, or other object or location. Depending on application, the user terminals 110 may include or incorporate any number of antenna dishes, which may be provided in various sizes, depths, or dimensions (e.g., small, medium, large, etc.). Although the terminals 110 may typically remain in the same location once mounted, the terminals 110 may be removed from their mounts, relocated to another location, and/or may be configured to be mobile terminals. For instance, the terminals 110 may be mounted on mobile platforms that facilitate transportation thereof from one location to another. Such mobile platforms may include, for example, any number of mobile vehicles, such as cars, buses, boats, planes, etc. It should be appreciated that such terminals 110 may generally be operational when still and not while being transported. That said, there may be scenarios where the terminals 110 may be transportable (mobile) terminals that remain operational during transit. As used herein, the terms "terminal," "customer terminal," "satellite terminal," and/or "VSAT" may be used interchangeably to refer to these terminal types.

It should be appreciated that any number of customer premise equipment (CPE) (not shown) may be communicatively coupled to the terminals 110. In some examples, the customer premise equipment (CPE) may include any number of computing or mobile devices. For example, such a computing or mobile device may include a laptop, a tablet, a mobile phone, an appliance, a camera, a sensor, a thermostat, a vehicle, a display, etc. In general, the customer premise equipment (CPE) may include, without limitation, any number of network-enabled computing devices, elements, or systems. It should be appreciated that a network of such devices may be commonly referred to as the "Internet of Things" (IoT).

As shown in FIG. 1, there may be different types of terminals or a plurality of groups of terminals 110 (e.g., customer VSATs). For example, each terminal such as 110A, 110B (collectively referred to as terminal or terminals 100) may be pertain to an individual terminal or plurality of groups. In some examples, the terminal 110A may be terminal(s) located in a similar geographic location than the terminal(s) 110B. The satellite 120 may be an object intentionally placed into orbit. In some examples, the satellite 120 may be an artificial satellite that may be configured to transmit and receive data signals. For example, the satellite 120 may form the one or more radio beams and provide connectivity between at least the terminals 110 and the gateway 130. More specifically, the satellite 120 may communicate data signals using these beams with the terminals 110 and with the gateway 130. It should be appreciated that the satellite 120 may form any number of beams to communicate data signals with any number of components, in same or different orbital plane. The satellite 120 may be in geosynchronous (GEO) orbit, low earth orbit (LEO) or mid earth orbit (MEO) satellite. The link conditions may vary more rapidly for LEO and MEO systems as the propagation path may be longer or shorter depending on the satellite location and different atmospheric/weather conditions encountered. In some examples, the satellite 120 may include, but not be limited to, a transponder satellite, a regenerative satellite, and/or other similar satellite.

The gateway 130 may include or be communicatively coupled to a transceiver 135, such as a radio frequency transceiver (RFT). The transceiver 135 may include an antenna unit of any type (e.g., transmitter, receiver, communication element, etc.), which may transmit and receive signals. In some examples, the transceiver 135 may be useable, by the gateway 130 of system 100, to transmit and receive data from the terminals 110, via communications from the satellite 120, and may be configured to route data and traffic from these terminals 110 to any other element or component in the system 100, such as the network data center 140 and/or network management system (NMS) 150. The gateway 130 may be further configured to route traffic to and from the public internet 180 and/or private network 170 across the satellite communication channels 115*a*, 115*b*, 125*a*, 125*b* to any terminal 110, which may then provide data communications or route traffic to any customer premise equipment (CPE) (not shown) associated with the terminal 110. Although depicted as a single element, the gateway 130 may include a single gateway, multiple gateways residing locally or remotely, in full or in part, relative to the other system components. As described in more detail below, the gateway 130, the network data center 140, and/or the network management systems (NMS) 150 may provide operations pertaining to the inroute transmission.

The system may include a processor (e.g., a computer processing unit (CPU), etc.), a data store and other such elements. In some examples, the system may be implemented in the gateway 130. The processor may include also various configurations including, without limitations, a personal computer, laptop, server, and other elements. The data store may be used, for example, to store and provide access to information pertaining to various operations of and in the system 100. Although depicted as a single element, the processor and/or the data store may be configured as a single element, multiple elements, or an array of elements. For example, the gateway 130 may include any number of processors and/or data stores to accommodate the needs of a particular system implementation. Various examples may further provide for redundant paths for components of the gateway 130. These redundant paths may be associated with backup components capable of being seamlessly or quickly switched in the event of a failure or critical fault of any primary component.

Referring to FIG. 1, the network data center 140 may be communicatively coupled to the gateway 130, as well as other system components, such as the network management system (NMS) 150, private network 170, and/or public network 180. In some examples, the network data center 140 may be a satellite network data center. In some examples, the network data center 140 may be include a plurality of network data centers that may be local or remote, in full or in part, relative to the other system components.

The network management system (NMS) 150, maintains, in full or in part, various information (configuration, processing, management, etc.) for the gateway 130, and terminals 110 and beams supported by the gateway 130. It should be appreciated that the network management system (NMS) 150 may or may not be co-located within the same physical structure as the gateway 130. Furthermore, the network management system (NMS) 150 may be single or a plurality distributed components that may be communicatively coupled to each other and/or with other system elements, such as the gateway 130 (e.g., using the previously described hardware and external networks). The network management system (NMS) 150 may, among other things, include a configuration manager or other similar management unit.

The business system 160, or other various system elements or components, may also be communicatively coupled to the network management system (NMS) 150 and/or gateway 130. In some examples, the business system 160 may include a virtual network operator (VNO), which may be configured to communicate with the gateway 130 and/or the network management system (NMS) 150. More particularly, a virtual network operator (VNO), in some scenarios, may be a business or government entity, that may have access (by purchase or license) to a managed service and associated capacity from a satellite network operator to provide communication connectivity and/or communication for a privately-owned set of terminals 110. The virtual network operator (VNO) may therefore manage various aspects of such terminals 110 via the gateway 130 and/or the network management system (NMS) 150.

The private network 170 and/or public network 180 may include any variety of networks. For example, the private network 170 may be a local area network (LAN), and the public network 180 may be a wide area network (WAN). That said, the private network 170 and/or public network 180 may each also be a local area network (LAN), wide area network (WAN), the Internet, a cellular network, a cable network, a satellite network, or other network that facilitates communication between the components of system 100 as well as any external element or system connected to the private network 170 and/or public network 180. The private network 170 and/or public network 180 may further include one, or any number, of the exemplary types of networks mentioned above operating as a stand-alone network or in cooperation with each other. For example, the private network 170 and/or public network 180 may utilize one or more protocols of one or more clients or servers to which they may be communicatively coupled. The private network 170 and/or public network 180 may facilitate transmission of data according to a transmission protocol of any of the devices and/or systems in the private network 170 and/or public network 180. Although each of the private network 170 and/or public network 180 may be depicted as a single network in FIG. 1, it should be appreciated that in some examples, each of the private network 170 and/or public network 180 may include a plurality of interconnected networks as well.

While the processors, components, elements, systems, subsystems, and/or other computing devices may be shown as single components or elements, one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100 and their components, as shown in FIG. 1.

In conventional synchronization to network or TDMA timing, a terminal may be required to be provided with its approximate location or distance to satellite to transmit into a special window known as a TDMA Bootstrap Aloha (BA) aperture to get timing feedback. However, this may induce a large inroute overhead as TDMA Bootstrap Aloha apertures may be relatively large, for example, on the order of a millisecond. Thus, the conventional technique may represent a non-trivial reduction of TDMA bandwidth available on a TDMA inroute. In some embodiments, the system and method described herein may utilize ASCMA based bootstrap technique. This may enable to avoid a need for time-slot based apertures (such as, for example, TDMA Bootstrap Aloha apertures) and associated overhead. Thus, the asynchronous nature of ASCMA may present an opportunity to use a unique and an effective approach for the terminals to establish TDMA timing. In an example, the ASCMA based bootstrap technique may allow to transmit a feedback request in form of ASCMA group bursts that may be sent at any time and does not require the opening of any apertures.

Figure 2:
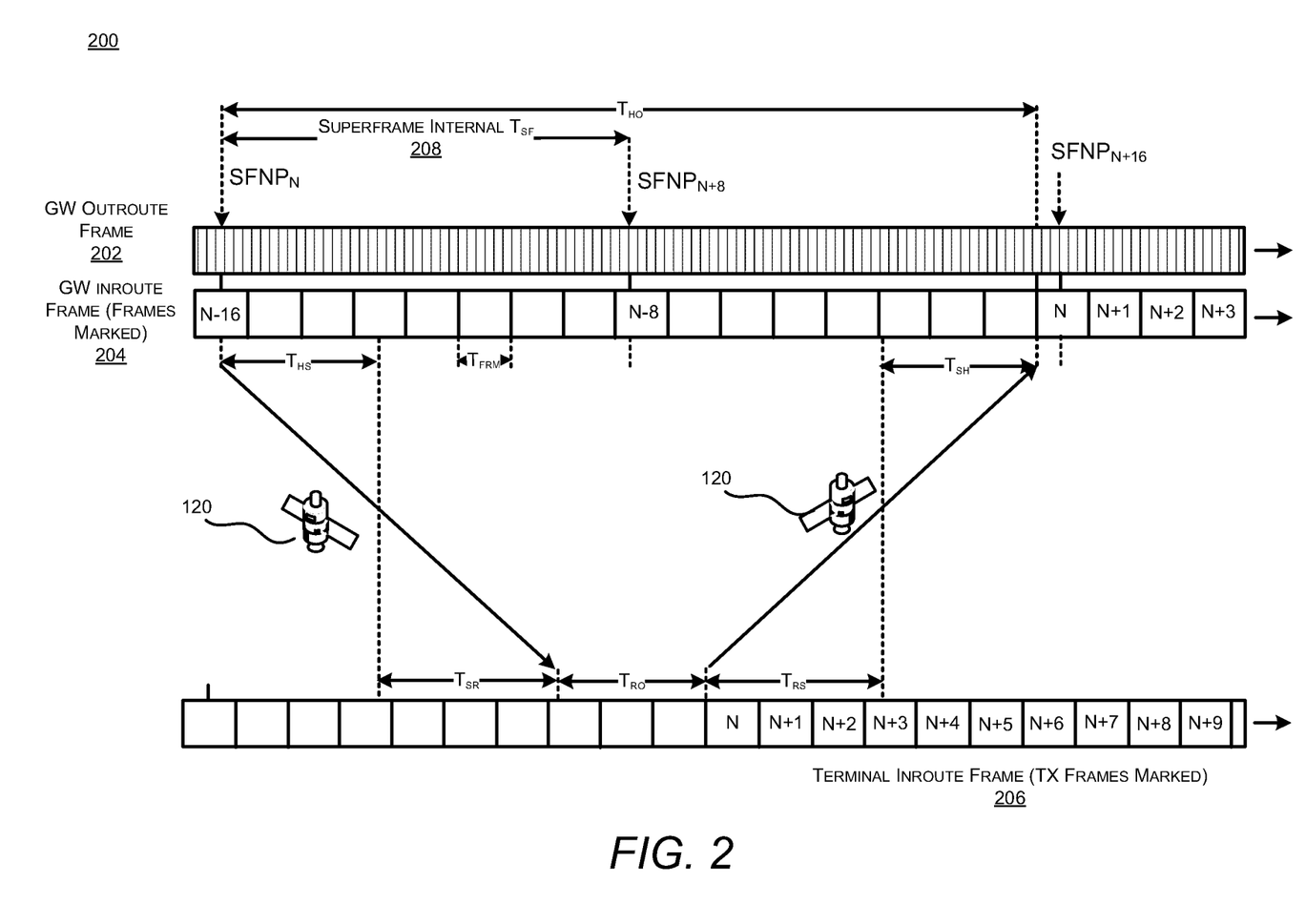
FIG. 2 illustrates a conventional operation showing timing relationship between a gateway and a terminal.

FIG. 2 illustrates a conventional operation showing timing relationship between a gateway and a terminal. The aspects in FIG. 2 may be provided to explain limitations involved in conventional timing establishment between a gateway and a terminal. As illustrated in FIG. 2, an outroute frame 202 and an inroute frame 204 may provide an account of the transmitted frames and received frames respectively at a gateway. Simultaneously, a terminal inroute frame 206 may indicate timeline of marked or acknowledged transmitted frames from a terminal to the gateway through a satellite 120. In reference to the inroute frame 206 (transmitted by terminal) or 204 (received at gateway), a horizontal (time) axis may be marked in units equal to the length of an inroute frame.

Further, as shown in FIG. 2, an inroute time axis may be divided into units of superframes, frames and slots. Each superframe may include a duration of $T_{SF}$ (shown as superframe interval 208) and each frame duration may be $T_{FRM}$. For example, the superframe interval $T_{SF}$ may be 360 ms and a frame duration $T_{FRM}$ may be 45 ms. The frame duration may be such that a superframe may include an integer number (M) of frames, and each frame may include an integer number of slots ($N_{SL}$). Further, each slot may include an integer number of symbols ($N_{SYM}$). This may also indicate that only certain specific combinations of the frame size, the symbol rate and the number of symbols per slot may be permissible.

As per the conventional timing establishment, the terminals may access an inroute by transmitting as bursts, where each of the bursts may occupy multiple slots. In conventional techniques, the bursts may pertain to scrambled coded multiple access (SCMA) technique. A unique word (UW) may be placed at the start of the burst to allow burst detection at the gateway such that the burst may be detected only if last symbol of the UW arrives within the aperture. As per the conventional technique, the terminals may perform one or more actions so as to time the bursts correctly. For example, the terminal may establish a time reference that may be tightly synchronized to the time reference of the gateway and further take into account time varying propagation delays. It may be noted that, by itself, a standard outroute (such as, for example, standard DVB-S2 outroute) may not include any time marker that a terminal may use to synchronize its time reference with the gateway. For example, it may be known that each gateway may broadcast a timing reference on the outroute, as superframe numbering packet(s) (SFNP), to all terminals in the beam. For example, the SFNP may be transmitted by the gateway on the outroute once every $T_{SF}$.

As shown in FIG. 2, $T_{HO}$ may represent gateway offset time or the space-time offset (STO), which may pertain to a time interval between an ideal instance of transmission of $SFNP_N$ at the gateway and the start of reception of frame N at the gateway.

The gateway offset time may be mathematically represented as $$T_{HO}=T_{HS}+T_{SR}+T_{RO}+T_{RS}+T_{SH}$$

where, $T_{HS}$ may represent propagation time from gateway to satellite (same value as $T_{SH}$), $T_{SR}$ may represent propagation time from satellite to terminal (same value as $T_{RS}$), $T_{RO}$ may represent terminal offset time i.e. time between "ideal" receipt of $SFNP_N$ at a terminal and transmit time for the start of transmission for frame N at this terminal; $T_{RS}$ may represent propagation time from terminal to satellite; $T_{SH}$ may represent propagation time from satellite to gateway; and $SFNP_N$ may represent Superframe numbering packet that marks frame N.

Assuming the gateway-to-satellite round-trip time ($T_{HS}+T_{SH}$) may also be written as $T_{HSH}$, $$T_{HO}=T_{HSH}+T_{SR}+T_{RO}+T_{RS}$$

Based on the above equation, the terminal offset time $T_{RO}$ may be expressed as $$T_{RO}=T_{HO}-T_{HSH}-T_{SRS}$$

where, the satellite-to-terminal-to-satellite round-trip time, $T_{SR}+T_{RS}$ may be written as $T_{SRS}$.

As shown in FIG. 2, the gateway may initiate an inroute transmission of TDMA frame N time interval, $T_{HO}$, after it may transmit the $SFNP_N$. In this case, the gateway offset time $T_{HO}$ may be set large enough such that it allows sufficient time for the SFNP to be received by the terminal that may be farthest from the satellite, in addition to time required for the terminal to perform some processing (for example, equivalent to two frames) followed by transmission of data burst in time to be received back at the gateway at the start of the frame number given in the SFNP packet. If $T_{HO}$ satisfies this condition, then it may mean that a terminal can receive a bandwidth allocation packet (BAP) and have sufficient time for processing it and transmitting a burst on the bandwidth allocated in the BAP. For example, a frame size of 45 msec and a superframe of 8 frames (360 msec) may be implemented such that assuming a maximum remote-satellite-gateway propagation delay of 270 msec, the value of $T_{HO}$ may be larger than 270+270+2*45=630 msec.

In some known examples, the typical value of $T_{HO}$ may be 695 msec, but it may vary slightly depending on satellite location. It may be appreciated that conventionally in practice, the actual instant of SFNP transmission may be slightly delayed from the intended instant of SFNP transmission due to transmission processing in the gateway. The value of $T_{HO}$ may be measured from the intended instance of SFNP transmission such that delay between the intended and the actual instances of transmission (called local delay) may be measured at the gateway and broadcast in the next SFNP transmission. The terminals may use this value in each SFNP to correct for the local delay of the previous SFNP transmission. Since the local delay may be different for various outroute streams, the SFNPs on different streams may contain different values in the local delay field. For example, if a terminal may transmit at the end of its $T_{RO}$ interval after receiving $SFNP_N$, the gateway may receive the burst in the first slot within frame N. If the terminal may need to transmit at a later slot in the frame N, it may add the time delay for this slot (and corresponding frame) to the end of the $T_{RO}$ interval to determine the time of transmission. The overall implementation of the gateway offset time $T_{HO}$ may add to overhead especially in scenarios, for example, if the terminal's location information may be less precise, thus requiring bigger Bootstrap Aloha (BA) apertures.

In an example, the system and method may facilitate aligning timing of an inroute transmission of a terminal with a gateway, by transmission of ASCMA group burst packets to the gateway such that the group burst packets may include a precise timing feedback request for the gateway. The ASCMA transmission may be in form of multiple encapsulated group burst packets that may be transmitted without time based scheduling/slots. In some examples, each packet in the plurality of encapsulated group burst packets may include a corresponding header and a unique word identifier. The unique word identifier may be a unique word that may be randomly selected by the terminal. For example, the unique word may include a single set of a 512-symbol based unique word. The unique word identifier (or the unique word) may enable identification of the encapsulated group burst packets pertaining to a common group.

Figure 3:
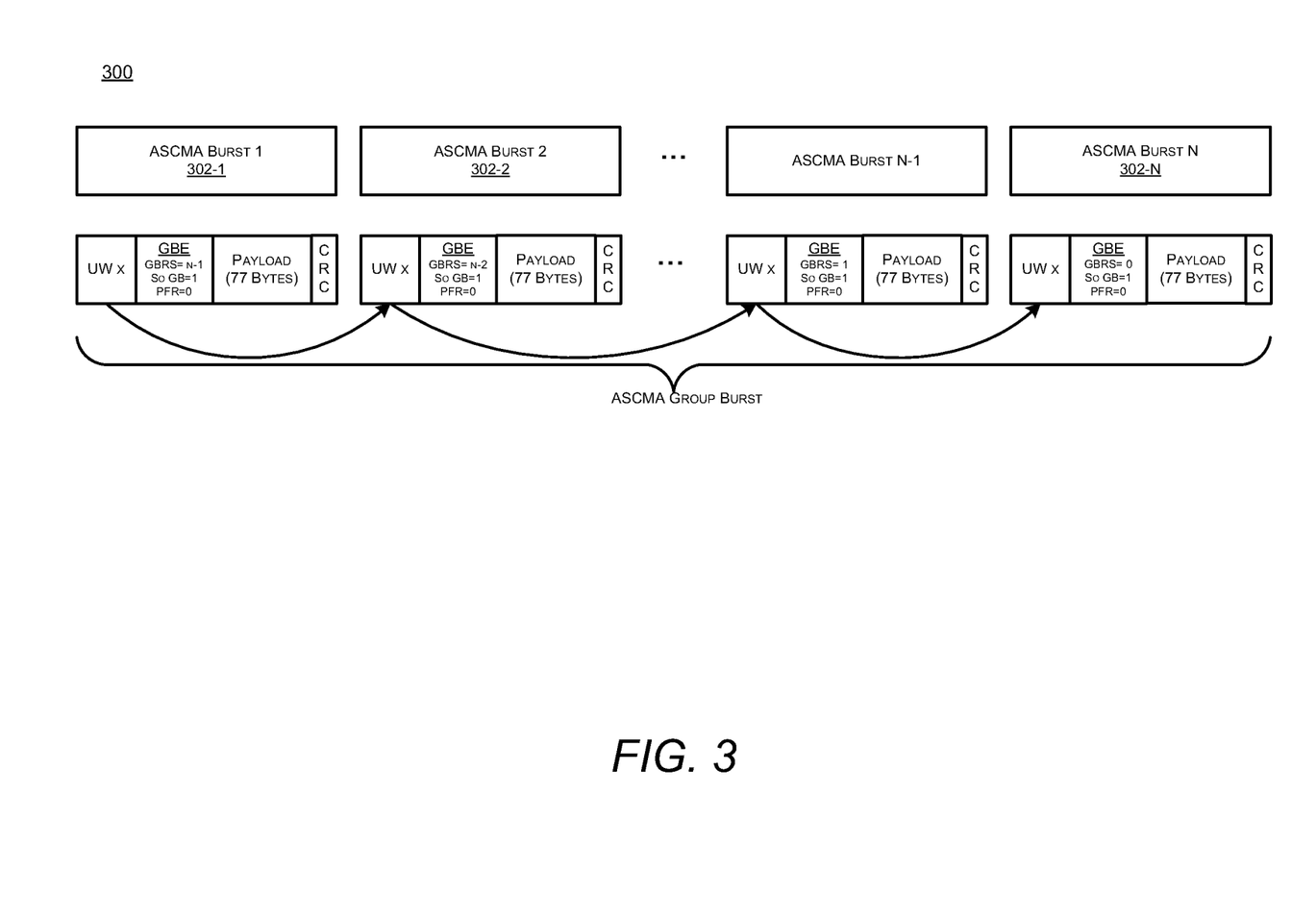
FIG. 3 illustrates an example depicting ASCMA group burst packets, according to an example.

FIG. 3 illustrates an example 300 depicting ASCMA group burst packets, according to an example. As shown in 300 in FIG. 3, and in an example, the group burst packets may pertain to a series of bursts including encoded ASCMA transmission that may be transmitted in an asynchronous manner and independent of pre-defined time slots. The group burst packets may include a process of encapsulating a link layer Inroute Burst Encapsulation (IBE) packet into multiple ASCMA bursts to avoid replicating the link layer IBE and Inroute Packet Encapsulation (IPE) overhead in each ASCMA burst. In some examples, the ASCMA group burst may be a sequence of back to back ASCMA bursts.

As shown in 300 in FIG. 3 in case of each group burst, shown as ASCMA Burst 1 (302-1), ASCMA Burst 2 (302-2), ..., ASCMA burst N (302-N) (collectively referred as group bursts 302), a GBE header may be present. The GBE header may include a Start of Group Burst (SoGB) flag and a Group Burst Remaining Size (GBRS) field. The SoGB flag may indicate whether or not the ASCMA burst may be first burst of a Group Burst. The GBRS field may indicate the number of ASCMA bursts left in this Group Burst after the current burst. For example, if a Group Burst requires a total of 10 ASCMA bursts, the GBRS field in the first burst will be set to 9, the GBRS field in the next burst will be set to eight 8, and similarly the GBRS field in the last burst of the Group Burst may be set to zero. In another example, if the entire group burst may fit in one ASCMA burst, the GBRS field will be set to zero (0). In an example, the group burst packets may include a precise timing feedback request (not shown) for the gateway. The precise timing feedback request may be added in a form of a precise feedback requested flag (PFR). In some examples, the precise feedback requested (PFR) flag may be added to a Group Burst Encapsulation (GBE) header of a first burst of the group burst packets. The precise feedback requested (PFR) flag may include a note pertaining to the random estimation of the estimated frame number.

Figure 4:
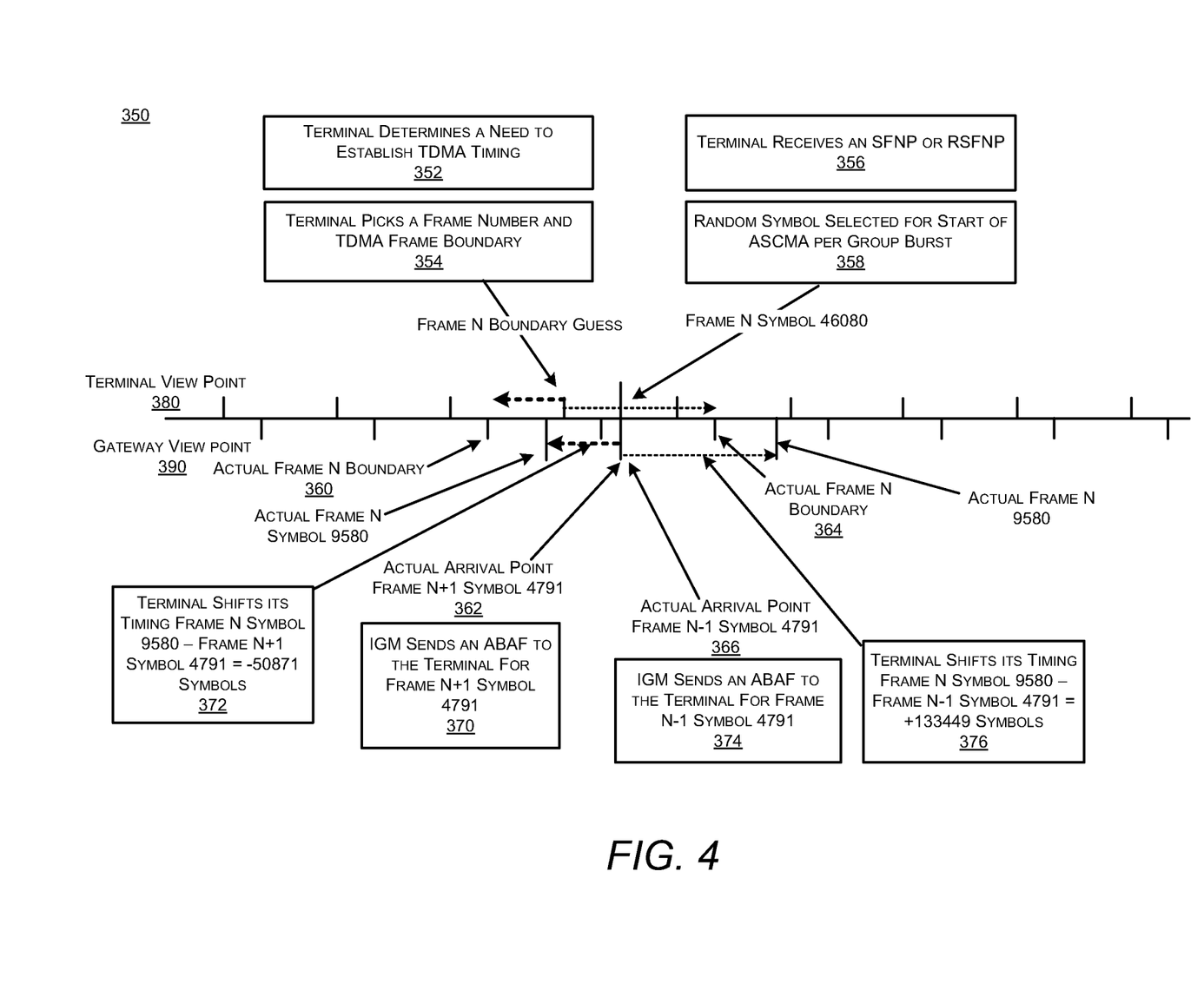
FIG. 4 illustrates an example depicting ASCMA bootstrap technique for aligning timing of an inroute transmission of a terminal with a gateway, according to an example.

FIG. 4 illustrates an example 350 depicting ASCMA bootstrap technique for aligning timing of an inroute transmission of a terminal with a gateway, according to an example. As shown in FIG. 4, at 352, the terminal may determine a need to establish an alignment of TDMA timing. The terminal viewpoint may be as shown at 380 and the gateway viewpoint may be as shown in 390. The system or processor may perform a random estimation of location pertaining to a time-division multiple access (TDMA) frame boundary of a gateway. As shown from the terminal viewpoint 380, the random estimation may consider an estimated frame number in the TDMA frame boundary (as shown in 354). The estimated frame number may correspond to a first time instance at which group burst packets from a terminal of a plurality of terminals may be expected to arrive at the gateway. The terminal may use inroute frame number information that the terminal may be receiving in SFNP or RSFNP messages that may be sent by the Timing Synchronization Application or Code Rate Organizer to make a guess for the estimated frame number. For example, as shown at 356, the random estimation of the estimated frame number may be performed based on an approximate value of an inroute frame number corresponding to a superframe numbering packet (SFNP) received at the terminal from the gateway. In some examples, the random estimation may include random selection of a symbol pertaining to start of ASCMA group burst (as shown at 358).

The terminal may transmit, using the ASCMA technique, the group burst packets (ASCMA group burst) to the gateway. The group burst packets include a precise timing feedback request for the gateway. For example, the terminal may send a small ASCMA group burst with the Precise Feedback Requested (PFR) flag sent in the first burst of the Group Burst Group Burst Encapsulation (GBE) header. The PFR flag may include a note of time instance pertaining to the random estimation of the estimated frame number. This means that the note may include information pertaining to the time when the terminal may have sent the group burst based on guess or estimation as to the current frame number and symbol number relative to its frame boundary guess. In some examples, inroute demodulator controller (IDC) of the gateway may ignore the PFR flag of all except for the first burst of a Group Burst.

In some examples, a feedback may be provided in response to the feedback request upon assessment of the PFR flag in the GBE header of the first burst by an inroute demodulator controller (IDC) of the gateway. The IDC may notify an inroute group manager (IGM) of the gateway to provide the feedback. For example, when the IDC may receive the group burst and evaluate corresponding PFR flag in the GBE header, the IDC may notify IGM that the terminal has requested for precise timing feedback. In some examples, instead of acknowledging the group burst using a standard protocol message (SGBA message), the IGM may instead send an ASCMA based Bootstrap Aloha Feedback (ABAF) message that may indicate the precise frame number and symbol number within that frame that the start of the group burst was received. The system at the terminal may thus receive, from the gateway, a feedback in a form of an ABAF message in response to the precise timing feedback request. The feedback may correspond to an actual frame number and symbol number pertaining to the TDMA boundary and corresponding to a second time instance at which the group burst packets may be received by the gateway.

In an example, the system at the terminal may determine an adjustment for aligning timing of an inroute transmission of the terminal with respect to the TDMA frame boundary of the gateway. The determination may be based on the comparison of the first time instance corresponding to the estimated frame and the second time instance corresponding to the actual frame number and symbol number. For example, when the terminal may receive the ABAF message, the message may indicate where the group burst may have been actually received in comparison to the guess that was originally made, where the difference between the two may represent the exact timing shift needed to align the TDMA timing of the terminal with the TDMA timing of the gateway. In some examples, the adjustment may pertain to a shift in timing corresponding to a shift from the estimated frame number to the actual frame number and the symbol number.

In some examples, to perform the comparison, the first step may be to convert both numbers into just symbols. This may be done by multiplying the frame number by the number of symbols in a frame and then adding the symbol offset to the answer. The number of symbols in a frame is determined by the ASCMA inroute symbol rate. For instance, there are 92160 symbols in a 2048 ksps 45 millisecond frame and 184320 symbols in a 4096 ksps 45 millisecond frame. To determine the symbol adjustment, the first time instance in symbols is subtracted from the feedback instance in symbols to obtain the symbol adjustment. The adjustment may be positive or negative depending on a position of the estimated frame number in the TDMA frame boundary with respect to the actual frame number and the symbol number.

In one example, as shown in FIG. 4, when the actual frame boundary may be at 360 and the actual arrival of the group burst may be at 362, the IGM may send the ABAF message to the terminal as shown in 370 (frame N+1 symbol 4791). In specific reference to FIG. 4, the terminal may output a perceived N symbol offset of 46,080. If N is 10, the first time instance in symbols is 10*92,160+46,080=967,680.

Figure 5A:
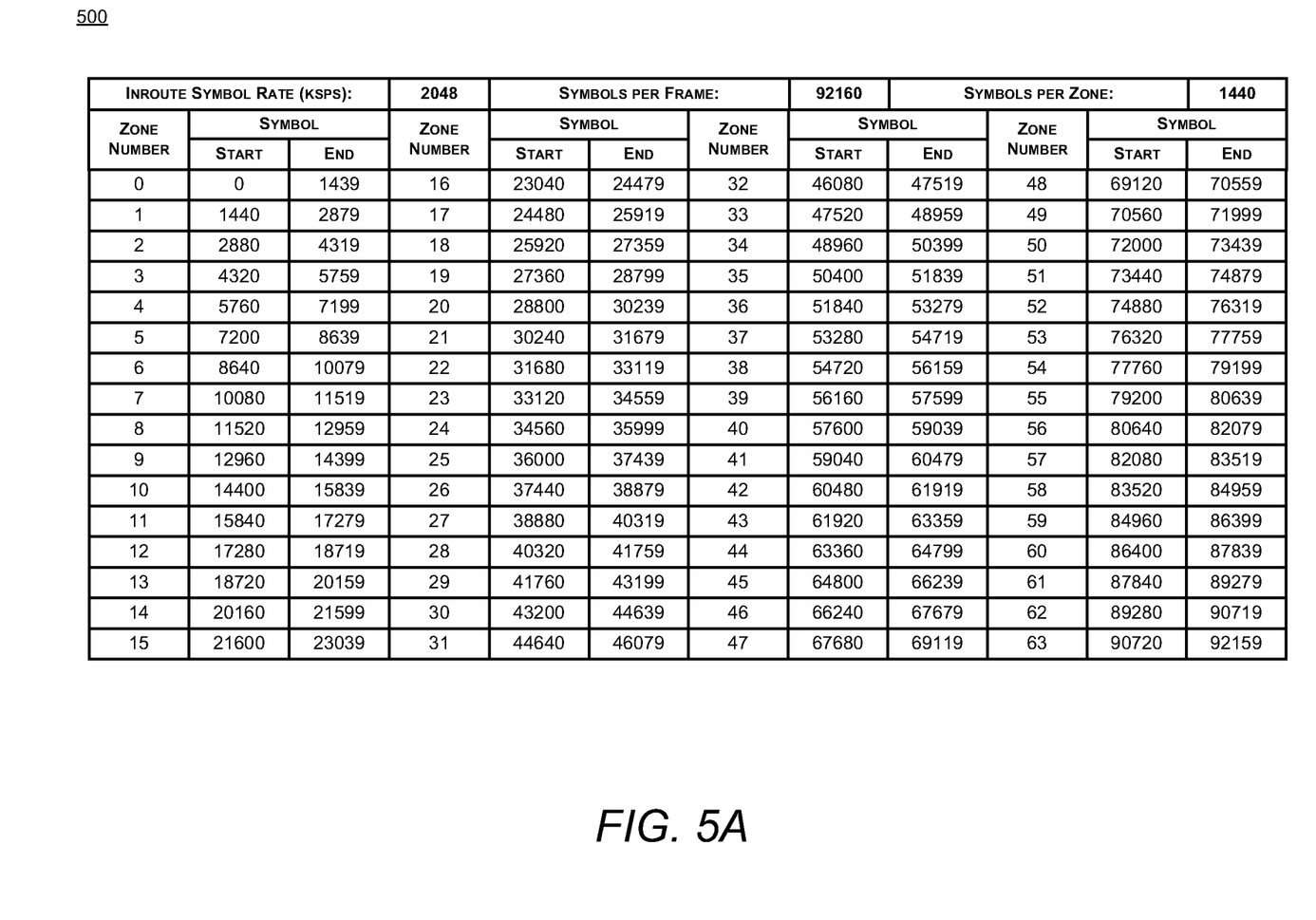
FIGS. 5A-5B illustrate examples for listing zone definitions, according to an example.
Figure 5B:
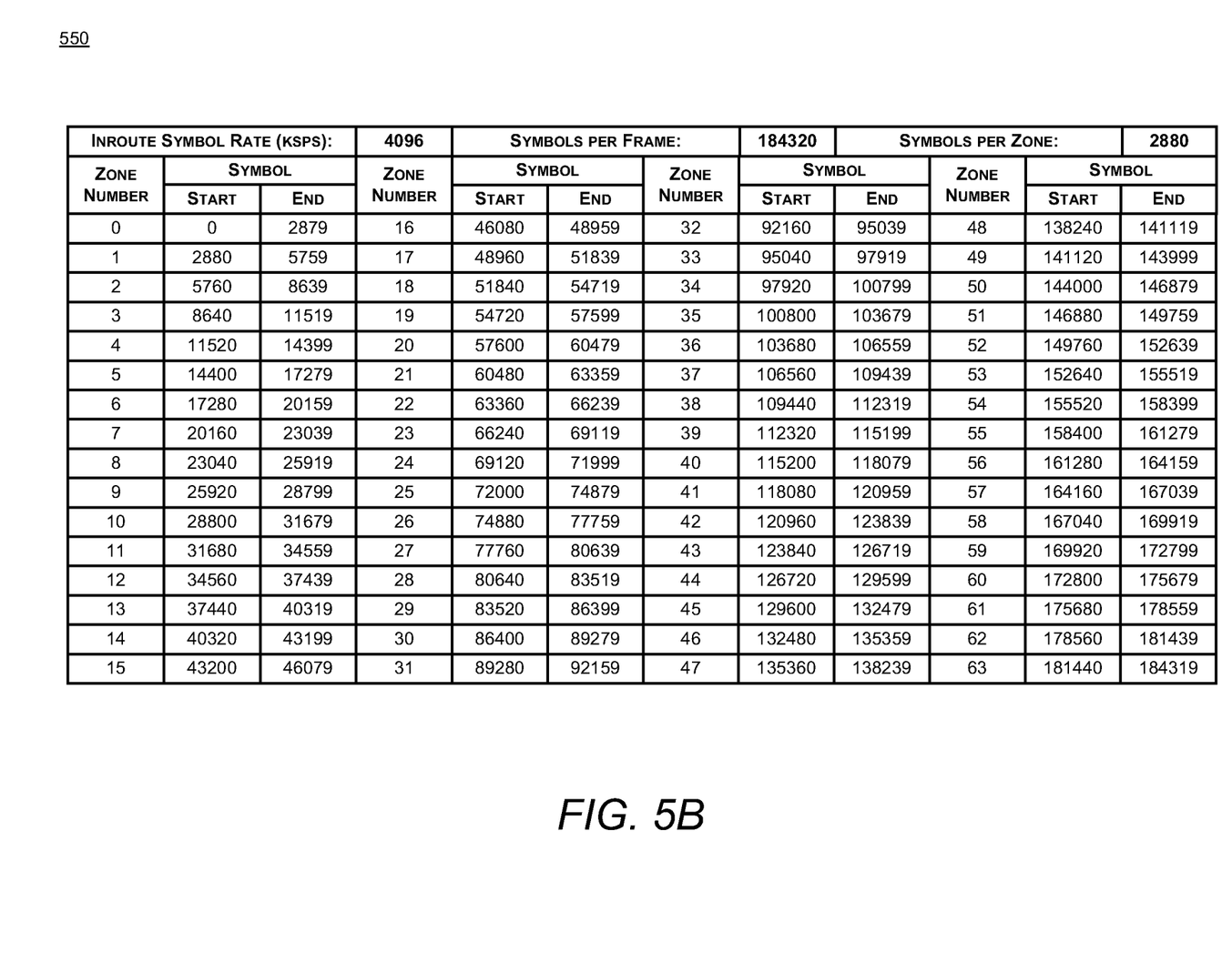

In an example of FIG. 4, the feedback is Frame N+1 Symbol Offset 4791. In this case, the adjustment in timing may be negative, as shown:
Feedback in symbols=(10+1)*92,160+4791=1,018,551
Timing adjustment=frame N symbol 9580–frame N+1 symbol 4791
Timing adjustment=967,680-1,018, 551=-50,871 symbols In another example, as shown in FIG. 4, when the actual frame boundary may be at 364 and the actual arrival of the group burst may be at 366, the IGM may send the ABAF message to the terminal as shown in 374 (frame N+1 symbol 4791). In this case, the adjustment in timing (as shown in 376) may be positive as shown:
Feedback in symbols=(10-1)*92,160+4791=834,231
Timing adjustment=frame N symbol 9580–frame N-1 symbol 4791
Timing adjustment=967,680-834,231=+133,449 symbols In some examples, ASCMA group packets may be handled by the IGM in a similar way that TDMA packets may be handled. This may include decryption and IPE packet reassembly back into protocol data unit or PDUs. In some examples, ASCMA group bursts may be acknowledged by the IGM via the group burst acknowledgement message. However, as no apertures may be used with ASCMA, to enable indicating which group burst may be acknowledged, a referencing of specific location may be included that may indicate the start of the group burst. However, this may represent a significant amount of overhead for each group burst acknowledgement. As a given terminal may only send one ASCMA burst at a time, the acknowledgment location may not be required to be precise. In some examples, to reduce the overhead required for the acknowledgement, the symbols within the TDMA frame may be divided into 64 zones with the zone number sent in the acknowledgement. If the terminal transmits a group burst starting in a particular zone, it may look for that zone in SGBA. FIGS. 5A-5B illustrate examples 500 and 550 respectively for listing zone definitions, according to an example. As shown in FIG. 5A, the zone definitions may be listed for a 2048 ksps ASCMA, while in FIG. 5B, the zone definitions may be listed for a 4096 ksps ASCMA inroute. In some examples, ASCMA may also support the concept of a partial group burst acknowledgement, where receiving a partial group burst acknowledgement from the IGM may indicate that the IGM may not have received the entire group burst but may have received enough of the group burst to receive and process the entire Inroute Burst Encapsulation (IBE) header of the group burst. In an example, for a partially acknowledged group burst, the terminal may assume that the IGM may have received adaptation messages (for example, a MODCOD Request) sent in the Group Burst excluding the payload.

In some examples, once the terminal may use the ASCMA based Bootstrap technique to establish timing, the terminal may follow normal timing maintenance procedures (not including ASCMA) to remain in sync. However, if the system or terminal may suspect that the timing synchronization may be lost, the terminal may re-implement the ASCMA based Bootstrap technique to reestablish timing. In some examples, the system or the terminal may monitor a corresponding acknowledgement received for the inroute transmission within the TDMA frame boundary of the gateway. This means that the ASCMA Bootstrap Aloha may utilize a backoff strategy when retransmitting if an ASCMA Bootstrap Aloha group burst may be not acknowledged. For example, when the acknowledgment may not be received for a group burst pertaining to the TDMA, the applied adjustment may be considered as out of sync and a re-adjustment may be applied. Several other features or advantages may be realized.

Figure 6:
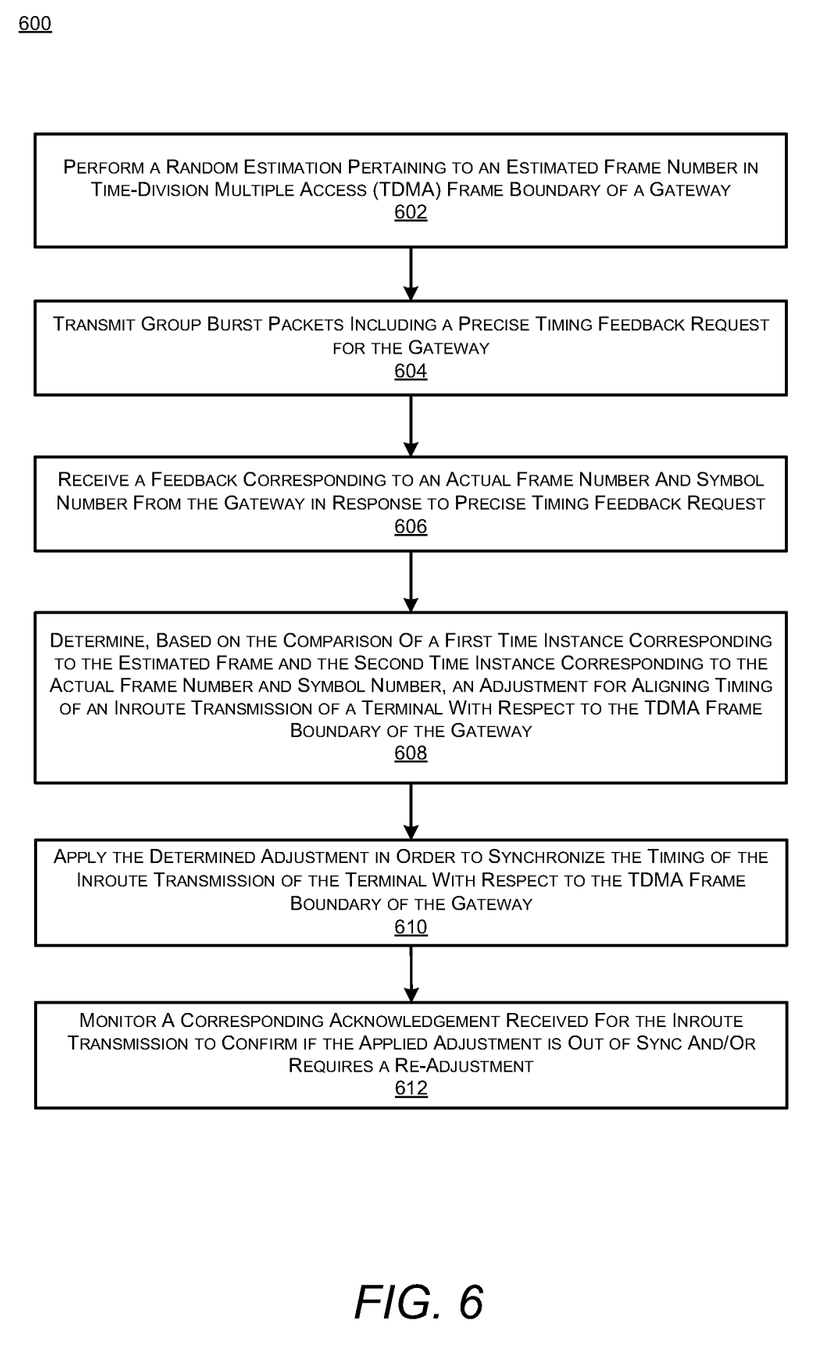
FIG. 6 illustrates a method for aligning timing of an inroute transmission of a terminal with a gateway, according to an example.

FIG. 6 illustrates a method 600 for aligning timing of an inroute transmission of a terminal with a gateway, according to an example. In an example, the inroute transmission may pertain to transmission from a plurality of terminals to a gateway. The method 600 may be provided by way of example, as there may be a variety of ways to carry out the method described herein. Although the method 600 may be primarily described as being performed by the system 100 of FIG. 1, the method 600 may be executed or otherwise performed by one or more processing components of another system or a combination of systems. Each block shown in FIG. 6 may further represent one or more processes, methods, or subroutines, and one or more of the blocks may include machine readable instructions stored on a non-transitory computer readable medium and executed by a processor or other type of processing circuit to perform one or more operations described herein.

At 602, the method may include performing, by a processor, a random estimation of location pertaining to a time-division multiple access (TDMA) frame boundary of a gateway. The random estimation may include an estimated frame number in the TDMA frame boundary such that the estimated frame number corresponds to a first time instance at which group burst packets from the terminal of the plurality of terminals may be expected to arrive at the gateway. At 604, the method may include transmitting, by the processor, using an asynchronous scrambled coded multiple access (ASCMA) technique, the group burst packets to the gateway. In an example, the group burst packets may include a precise timing feedback request for the gateway.

At 606, the method may include receiving, by the processor, from the gateway, a feedback in response to the precise timing feedback request. In an example, the feedback may correspond to an actual frame number and symbol number corresponding to a second time instance at which the group burst packets may be received by the gateway. At 606, the method may include determining, by the processor, based on the comparison of the first time instance corresponding to the estimated frame and the second time instance corresponding to the actual frame number and symbol number, an adjustment for aligning timing of the inroute transmission of the terminal with respect to the TDMA frame boundary of the gateway. At 608, the method may include determining, by the processor, an adjustment for aligning timing of the inroute transmission of the terminal with respect to the TDMA frame boundary of the gateway. In an example, the determination may be based on the comparison of the first time instance corresponding to the estimated frame and the second time instance corresponding to the actual frame number and symbol number. At 610, the method may include applying, by the processor, the determined adjustment to synchronize the timing of the inroute transmission of the terminal with respect to the TDMA frame boundary of the gateway. At 612, the method may include monitoring, by the processor, a corresponding acknowledgement received for the inroute transmission to confirm if the applied adjustment is out of sync and/or requires a readjustment.

In some examples, the group burst packets may pertain to a series of burst including encoded ASCMA transmission that may be transmitted in an asynchronous manner and independent of pre-defined time slots. In some examples, the random estimation of the estimated frame may be performed based on an approximate value of an inroute frame number corresponding to a superframe numbering packet (SFNP) received at the terminal from the gateway.

In some examples, the feedback may be in a form of a ASCMA Bootstrap Aloha Feedback (ABAF) including information related to the actual frame number and the symbol number pertaining to the TDMA boundary at which the group burst packet may be actually received.

In some examples, the adjustment may pertain to a shift in timing corresponding to a shift from the estimated frame number to the actual frame number and the symbol number. For example, the adjustment may be positive or negative depending on position of the estimated frame number in the TDMA frame boundary with respect to the actual frame number and the symbol number.

In some examples, the precise timing feedback request may be added in a form of a precise feedback requested flag added to Group Burst Encapsulation (GBE) header of a first burst of the group burst packets. The precise feedback requested flag may include a note pertaining to the random estimation of the estimated frame number. In some examples, the feedback may be provided in response to the feedback request upon assessment of the PFR flag in the GBE header of the first burst by an inroute demodulator controller (IDC) of the gateway. In an example, the IDC may notify an inroute group manager (IGM) of the gateway to provide the feedback.

In some examples, the method may include monitoring a corresponding acknowledgement received for the inroute transmission within the TDMA frame boundary of the gateway. In an example, when the acknowledgment may not be received for a group burst pertaining to the TDMA, the applied adjustment may be considered as out of sync and a re-adjustment may be applied.

Figure 7:
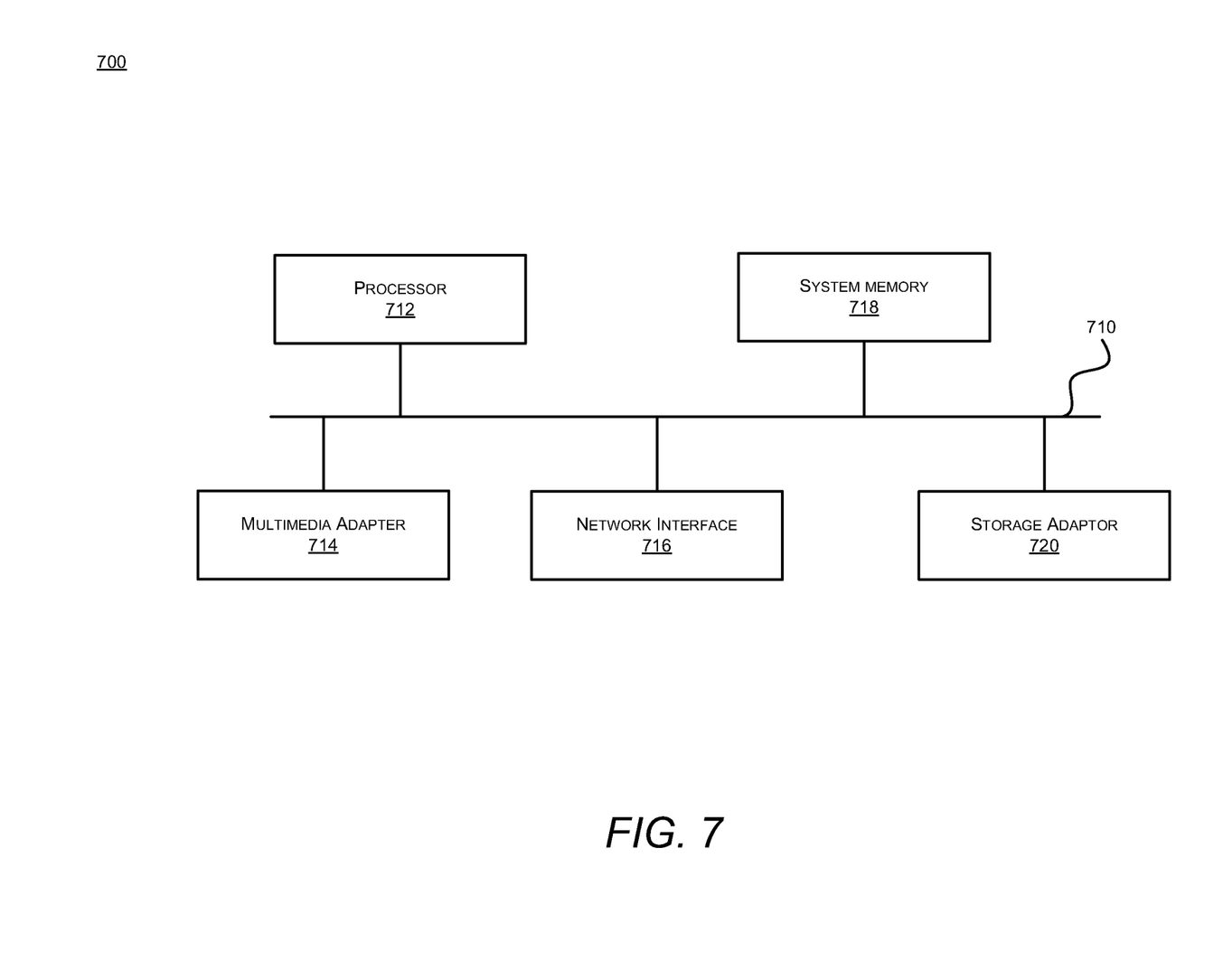
FIG. 7 illustrates a block diagram of a computer system for aligning timing of an inroute transmission of a terminal with a gateway, according to an example.

FIG. 7 illustrates a block diagram of a computer system 700 for aligning timing of an inroute transmission of a terminal with a gateway, according to an example. The computer system 700 may be part of or any one of the terminals 110, the gateway 130, the network data center 140, the network management system (NMS) 150, the business system 160, as shown in system 100 to perform the functions and features described herein. The computer system 700 may include, among other things, an interconnect 710, a processor 712, a multimedia adapter 714, a network interface 716, a system memory 718, and a storage adapter 720.

The interconnect 710 may interconnect various subsystems, elements, and/or components of the computer system 700. As shown, the interconnect 710 may be an abstraction that may represent any one or more separate physical buses, point-to-point connections, or both, connected by appropriate bridges, adapters, or controllers. In some examples, the interconnect 710 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 710 may allow data communication between the processor 712 and system memory 718, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 712 may be the central processing unit (CPU) of the computing device and may control overall operation of the computing device. In some examples, the processor 712 may accomplish this by executing software or firmware stored in system memory 718 or other data via the storage adapter 720. The processor 712 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 714 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 716 may provide the computing device with an ability to communicate with a variety of remove devices over a network (e.g., private network 170 or public network 180 of FIG. 1) and may include, for example, an Ethernet adapter, a Fiber Channel adapter, and/or other wired- or wireless-enabled adapter. The network interface 716 may provide a direct or indirect connection from one network element to another, and facilitate communication and between various network elements.

The storage adapter 720 may connect to a standard computer-readable medium for storage and/or retrieval of information, such as a fixed disk drive (internal or external).

Many other devices, components, elements, or subsystems (not shown) may be connected in a similar manner to the interconnect 710 or via a network (e.g., private network 170 or public network 180 of FIG. 1). Conversely, all of the devices shown in FIG. 7 need not be present to practice the systems and methods described herein. The devices and subsystems can be interconnected in different ways from that shown in FIG. 7. Code or computer-readable instructions to implement the dynamic approaches for payment gateway selection and payment transaction processing of the system 700 may be stored in computer-readable storage media such as one or more of system memory 718 or other storage. Code or computer-readable instructions to implement the dynamic approaches for payment gateway selection and payment transaction processing of the system 700 may also be received via one or more interfaces and stored in memory. The operating system provided on computer system 700 may be MS-DOS®, MS-WINDOWS®, OS/2®, OS X®, IOS®, ANDROID®, UNIX®, Linux®, or another operating system.

As mentioned above, what may be shown and described with respect to the systems and methods above may be illustrative. While examples described herein may be directed to configurations as shown, it should be appreciated that any of the components described or mentioned herein may be altered, changed, replaced, or modified, in size, shape, and numbers, or material, depending on application or use case, and adjusted for the inroute transmission in satellite communication systems.

It should be appreciated that the systems and methods described herein may facilitate alignment in timing of an inroute transmission in satellite communication systems. It should also be appreciated that the systems and methods, as described herein, may also include or communicate with other components not shown. For example, these may include external processors, counters, analyzers, computing devices, and other measuring devices or systems.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples may be directed to satellite communication systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

By leveraging existing customer terminals, the system and methods described herein may provide efficient processing techniques and a cost-effective approach that may be readily integrated into various and existing network equipment. The systems and methods described herein may provide mechanical simplicity and adaptability to small or large satellite communication systems. Ultimately, the systems and methods described herein may increase efficiency, reduce cost, maximize existing equipment, minimize adverse effects of traditional systems, and improve inroute transmission performance.

What has been described and illustrated herein may be examples of the systems and methods along with some variations. The terms, descriptions, and figures used herein may be set forth by way of illustration only and may be not meant as limitations. Many variations may be possible within the scope of the systems and methods described herein, which may be intended to be defined by the following claims—and their equivalents—in which all terms may be meant in their broadest reasonable sense unless otherwise indicated.

The invention claimed is:

1. A system comprising:
   a processor; and
   a memory storing instructions, which when executed by the processor, cause the processor to:
   perform a random estimation of location pertaining to a time-division multiple access (TDMA) frame boundary of a gateway, wherein the random estimation considers an estimated frame number in the TDMA frame boundary such that the estimated frame number corresponds to a first time instance at to which group burst packets from a terminal of a plurality of terminals are expected to arrive at the gateway;
   transmit, using an asynchronous scrambled coded multiple access (ASCMA) technique, the group burst packets to the gateway, wherein the group burst packets comprise a precise timing feedback request for the gateway;
   receive, from the gateway, a feedback in response to the precise timing feedback request, wherein the feedback corresponds to an actual frame number and symbol number corresponding to a second time instance at which the group burst packets were received by the gateway;
   determine, based on a comparison of the first time instance corresponding to the estimated frame and the second time instance corresponding to the actual frame number and symbol number, an adjustment for aligning timing of an inroute transmission of the terminal with respect to the TDMA frame boundary of the gateway; and
   apply the determined adjustment to synchronize the timing of the inroute transmission of the terminal with respect to the TDMA frame boundary of the gateway.

2. The system of claim 1, wherein the group burst packets pertain to a series of bursts comprising encoded ASCMA transmission that are transmitted in an asynchronous manner and independent of pre-defined time slots.

3. The system of claim 1, wherein the random estimation of the estimated frame number is performed based on an approximate value of an inroute frame number corresponding to a superframe numbering packet (SFNP) received at the terminal from the gateway.

4. The system of claim 1, wherein the feedback is an ASCMA Bootstrap Aloha Feedback (ABAF) comprising information related to the actual frame number and the symbol number pertaining to the TDMA boundary at which the group burst packets are actually received.

5. The system of claim 1, wherein the adjustment pertains to a shift in timing corresponding to a shift from the estimated frame number to the actual frame number and the symbol number.

6. The system of claim 5, wherein the adjustment is positive or negative depending on a position of the estimated frame number in the TDMA frame boundary with respect to the actual frame number and the symbol number.

7. The system of claim 1, wherein the precise timing feedback request is added as a precise feedback requested (PFR) flag.

8. The system of claim 7, wherein the PFR flag is added to a Group Burst Encapsulation (GBE) header of a first burst of the group burst packets.

9. The system of claim 8, wherein the feedback is provided in response to the feedback request upon assessment of the PFR flag in the GBE header of the first burst by an inroute demodulator controller (IDC) of the gateway, and wherein the IDC notifies an inroute group manager (IGM) of the gateway to provide the feedback.

10. The system of claim 7, wherein the PFR flag comprises a note pertaining to the random estimation of the estimated frame number.

11. The system of claim 1, wherein the system monitors a corresponding acknowledgement received for the inroute transmission within the TDMA frame boundary of the gateway, wherein when the acknowledgment is not received for a group burst pertaining to the TDMA, the applied adjustment is considered as out of sync and a re-adjustment is applied.

12. A method comprising:
    performing, by a processor, a random estimation of location pertaining to a time-division multiple access (TDMA) frame boundary of a gateway, wherein the random estimation considers an estimated frame number in the TDMA frame boundary such that the estimated frame number corresponds to a first time instance at which group burst packets from the terminal of the plurality of terminals are expected to arrive at the gateway;
    transmitting, by the processor, using an asynchronous scrambled coded multiple access (ASCMA) technique, the group burst packets to the gateway, wherein the group burst packets comprise a precise timing feedback request for the gateway;
    receiving, by the processor, from the gateway, a feedback in response to the precise timing feedback request, wherein the feedback corresponds to an actual frame number and symbol number corresponding to a second time instance at which the group burst packets are received by the gateway;

determining, by the processor, based on the comparison of the first time instance corresponding to the estimated frame and the second time instance corresponding to the actual frame number and symbol number, an adjustment for aligning timing of the inroute transmission of the terminal with respect to the TDMA frame boundary of the gateway; and applying, by the processor, the determined adjustment to synchronize the timing of the inroute transmission of the terminal with respect to the TDMA frame boundary of the gateway.

13. The method of claim 12, wherein the group burst packets pertain to a series of burst comprising encoded ASCMA transmission that are transmitted asynchronously and independent of pre-defined time slots.

14. The method of claim 12, wherein the random estimation of the estimated frame is performed based on an approximate value of an inroute frame number corresponding to a superframe numbering packet (SFNP) received at the terminal from the gateway.

15. The method of claim 12, wherein the feedback is a ASCMA Bootstrap Aloha Feedback (ABAF) comprising information related to the actual frame number and the symbol number pertaining to the TDMA boundary at which the group burst packet is actually received.

16. The method of claim 12, wherein the adjustment pertains to a shift in timing corresponding to a shift from the estimated frame number to the actual frame number and the symbol number, and wherein the adjustment is positive or negative depending on a position of the estimated frame number in the TDMA frame boundary with respect to the actual frame number and the symbol number.

17. The method of claim 12, wherein the precise timing feedback request is added as a precise feedback requested (PFR) flag added to Group Burst Encapsulation (GBE) header of a first burst of the group burst packets, and wherein the precise feedback requested flag comprises a note pertaining to the random estimation of the estimated frame number.

18. The method of claim 17, wherein the feedback is provided in response to the feedback request upon assessment of the PFR flag in the GBE header of the first burst by an inroute demodulator controller (IDC) of the gateway, and wherein the IDC notifies an inroute group manager (IGM) of the gateway to provide the feedback.

19. The method of claim 12, wherein the method comprises monitoring a corresponding acknowledgement received for the inroute transmission within the TDMA frame boundary of the gateway, wherein when the acknowledgment is not received for a group burst pertaining to the TDMA, the applied adjustment is considered as out of sync and a re-adjustment is applied.

20. A non-transitory computer-readable storage medium having an executable stored thereon, which, when executed, instructs a processor to perform a method as follows:

perform a random estimation of location pertaining to a time-division multiple access (TDMA) frame boundary of a gateway, wherein the random estimation considers an estimated frame number in the TDMA frame boundary such that the estimated frame number corresponds to a first time instance at which group burst packets from a terminal of a plurality of terminals are expected to arrive at the gateway;

transmit, using an asynchronous scrambled coded multiple access (ASCMA) technique, the group burst packets to the gateway, wherein the group burst packet comprises a precise timing feedback request for the gateway;

receive, from the gateway, a feedback in response to the precise timing feedback request, wherein the feedback corresponds to an actual frame number and symbol number corresponding to a second time instance at which the group burst packets are received by the gateway;

determine, based on the comparison of the first time instance corresponding to the estimated frame and the second time instance corresponding to the actual frame number and symbol number, an adjustment for aligning timing of the inroute transmission of the terminal with respect to the TDMA frame boundary of the gateway; and apply the determined adjustment to synchronize the timing of the inroute transmission of the terminal with respect to the TDMA frame boundary of the gateway.

* * * * *